(12) United States Patent
Yilmazer et al.

(10) Patent No.: US 12,021,570 B2
(45) Date of Patent: Jun. 25, 2024

(54) TIME-DOMAIN LINK DIAGNOSTIC TOOL

(71) Applicant: Maxim Integrated Products, Inc., San Jose, CA (US)

(72) Inventors: Caglar Yilmazer, Istanbul (TR); Refik Sever, Istanbul (TR)

(73) Assignee: Maxim Integrated Products, Inc., San Jose, CA (US)

( * ) Notice: Subject to any disclaimer, the term of this patent is extended or adjusted under 35 U.S.C. 154(b) by 170 days.

(21) Appl. No.: 17/724,047

(22) Filed: Apr. 19, 2022

(65) Prior Publication Data

US 2022/0345231 A1 Oct. 27, 2022

Related U.S. Application Data

(60) Provisional application No. 63/180,378, filed on Apr. 27, 2021.

(51) Int. Cl.
*G01R 31/08* (2020.01)
*H04B 17/21* (2015.01)

(52) U.S. Cl.
CPC .................................. *H04B 17/21* (2015.01)

(58) Field of Classification Search
CPC ........ G01R 31/11; G01R 31/58; G01R 31/72; G01R 31/31905; G01R 31/31709; G01R 27/28; G01R 35/005; H04B 17/14; H04B 17/21
See application file for complete search history.

(56) References Cited

U.S. PATENT DOCUMENTS

| | | | |
|---|---|---|---|
| 7,165,200 B2 | 1/2007 | Jani et al. | |
| 7,245,129 B2* | 7/2007 | Wajcer | H04B 3/46 324/533 |
| 7,960,976 B1 | 6/2011 | Lo | |
| 11,121,782 B2 | 9/2021 | Zang et al. | |
| 2005/0057257 A1* | 3/2005 | Fleischman | G01R 31/31928 324/500 |
| 2012/0066559 A1* | 3/2012 | Chien | G11C 29/12 714/704 |
| 2017/0023628 A1* | 1/2017 | Peeters Weem | G01R 31/72 |
| 2017/0023632 A1* | 1/2017 | Johnson | G01R 31/11 |
| 2018/0149693 A1* | 5/2018 | Sommervogel | H04B 3/46 |
| 2020/0049755 A1* | 2/2020 | Cabanillas | G01R 31/11 |

FOREIGN PATENT DOCUMENTS

WO 2020232289 A1 11/2020

* cited by examiner

*Primary Examiner* — Thang X Le
(74) *Attorney, Agent, or Firm* — Kevin E. West; Advent, LLP (57) ABSTRACT

A system and method for performing diagnostics of a link capable of measuring a signal pulse having a pulse width that is narrower than a sampling period of a clock signal used for data sampling. The system incorporates a phase interpolator that shifts a phase of the clock signal while preserving the sampling period of the clock signal. The method includes generating and transmitting a plurality of pulses to a link, where then each pulse is sampled according to the clock signal. After each pulse is sampled, the phase interpolator shifts the phase of the clock signal so that each pulse is sampled according to a unique phase, thereby increasing signal measurement accuracy without decreasing the sampling period.

20 Claims, 9 Drawing Sheets

TIME-DOMAIN LINK DIAGNOSTIC TOOL

BACKGROUND

Modern network communication systems are generally of either the wired or the wireless type. Of the wired type, these networks may be constructed using any of several existing technologies, including metallic twisted pair, coaxial, optical fiber, etc. Communications in a wired network typically occur between two communication transceivers over a length of cable making up the communication channel wherein each transceiver includes transmitter and receiver components.

Typically, it is desirable to be able to determine if a fault exists across the cable since the fault disrupts communication between the transceivers, and once a fault is detected, it is desirable to determine information about the fault, such as its location and type of fault along the cable. To determine the existence of a fault, a diagnostic method called time-domain reflectometry (TDR) is commonly used whereby pulses are transmitted from one end of the cable while monitoring for any signal reflections of the pulses that correspond to the fault. Under normal circumstances, the cable between two impedance-matched receivers should produce no reflection after pulse transmission. However, if a signal reflection is detected, the characteristics of the signal reflection are capable of being evaluated to determine the type of fault, such as an open cable, shorted cable, unmatched load, and any irregularities of impedance along the cable. Furthermore, the time from pulse transmission to reflected signal reception can be used to determine the location of the fault since the distance to the fault is proportional to the time duration between pulse transmission and signal reflection.

The ability to gather diagnostics on the cable is particularly useful in the case where physical access to the cable is difficult or impossible. Further, it is desirable to have the cable diagnostics capabilities built into the communications transceiver without requiring significant modification to existing transceivers.

DRAWINGS

The Detailed Description is described with reference to the accompanying figures. The use of the same reference numbers in different instances in the description and the figures may indicate similar or identical items. The drawings are not necessarily to scale.

DETAILED DESCRIPTION

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope.

Overview

The following addresses the shortcomings of current time-domain reflectometry (TDR) methods and technology. TDR used in performing diagnostics on a link (i.e., cable) between two transceivers presently requires the transmitted pulse and the reflected signal (collectively referred to as a "link signal") to remain in an analog form allowing the link signals to be outputted on an oscilloscope display screen or the transmitted pulse and the reflected signal to be digitally converted into a computational dataset. The former is impractical from an automation standpoint as it would require a user to monitor signals measured from an oscilloscope and to make a diagnostic determination that is subjective to the user. Furthermore, this approach would also require the network communicating across the link to remain silent, aside from the TDR link signals, in order for the user to discern signals separately from otherwise typical network communication traffic. Alternatively, an analog to digital converter can be used to measure the link signal directly. In this method, the amplitude of the link signal is sampled periodically according to a sampling clock (i.e., bitrate) and is stored as a dataset thereby describing the signal as a data plot of amplitude (typically in voltage) and time of capture. However, this approach is generally more costly in terms of power, equipment volume, and data storage volume.

To overcome these undesired costs, another method of performing TDR is to simplify the output signals for diagnostics by further digitizing the link signal into a binary condition of either the link signal amplitude exceeding a threshold amplitude or not. In other words, transmitted pulses and reflected signals are reduced to binary events of detection or nondetection. Although this approach is useful in simplifying measurements, this method also comes at a cost of accuracy due to limitations of the sampling rate: should the transmission pulse have a width that is narrower than a sampling period associated with the sampling rate, then there arises a chance that the transmission pulse and subsequent reflected signal may fall between the sampling period and thereby miss detection. Thus, the more narrow the transmitted pulse is compared to the sampling period, the higher the probability of missing detection of the link signal. As a result, the use of present TDR diagnostics techniques limits how short in length a link can be (while employing diagnostics) and how close the fault may exist relative to the origin of the transmitted pulse.

In general, a transmitted pulse should have a width that allows the transmitted pulse to traverse a length of the link and reflect back without interfering with itself. This limitation not only presents a minimum length for the link but also a minimum distance that a fault can be located.

Thus, two limiting bounds for the digital TDR diagnostic method are presented: for a TDR system having a predefined sample rate (and an associated sample period, wherein the sample period is inversely related to the sample rate), the transmitted pulse must be wide enough to be captured by the sample period while also being narrow enough to not interfere with itself. While in some instances the sample rate can be increased to have a smaller sample period, the sample rate can only be increased up to the processing rate of a receiving processor. For configurations having a link with a relatively short length, the sample rate becomes a significant obstacle for diagnostic accuracy. Thus, it is desired to increase the accuracy of a digital TDR method without increasing the sample rate as well as avoid the undesired costs of power, equipment volume, and data storage volume found in analog to digital conversion in measuring the signal directly.

One method of performing a TDR measurement is to incorporate a programmable time delay that adds a time delay to a sample clock by using a high-performance Field Programmable Gate Array (FPGA) or an application-specific integrated circuit (ASIC) along with a plurality of Phase Locked Loops (PLL) clocks generated from a single clock source. However, this method produces time delays that are undesirably variable due to FPGA and ASIC sensitivity to changes in process, voltage, and temperature (PVT), and as a result, would require additional corrections in order to produce reasonably accurate and consistent TDR measurements.

The present disclosure is directed to a digital TDR system and method that is capable of measuring a transmitted pulse width that is narrower than a sampling period, thereby reducing the minimum distance for detection between an origin of the transmitted pulse and a fault located along a link, and subsequently increasing diagnostic accuracy and permitting the digital TDR system to be applied to shorter links that were previously limited by the sampling period. This is accomplished by processing a primary clock signal (having a sampling period and associated sampling rate) through a phase interpolator, wherein the phase interpolator outputs a processed clock signal that has a phase difference relative to the primary clock signal.

The use of a phase interpolator for generating a phase difference in the sample rate for digital TDR allows for significant advantages over the use of the time delay method (e.g., FPGA/ASIC with PLL). For example, the phase interpolator can span a clock period for any given set of parameters regardless of any PVT variations. In other words, phase interpolators do not require additional corrections due to PVT variations in order to perform a TDR measurement. Furthermore, phase interpolators can produce an infinite amount of phase difference between the primary clock signal and the processed clock signal by sweeping and overflowing a phase input produced by a controller.

In an embodiment, a first transceiver is configured to output a plurality of pulses such that each pulse is permitted to have a width that is narrower than the period. The respective pulses of the plurality of pulses are separated by a relaxation interval that allows each pulse to be transmitted and potentially reflect without interfering with a next pulse to be transmitted. After each pulse is transmitted, the phase interpolator shifts the phase of the processed clock signal by a predetermined step, thereby sampling each pulse according to a unique phase relative to the primary clock signal as well as the other processed clock signals, which subsequently outputs for each pulse a subset of detected amplitudes characteristic of the link based on the unique phase. This process is repeated for each pulse until the shifted phase spans across the period of the primary clock signal. With each pulse being identical to each other and the subsequent reflections likewise being identical to each other (if a fault exists), the present system and method can determine diagnostic information about the link by compiling all the subsets of detected amplitudes into a superimposed mapping of the plurality of pulses. The present system and method thus increases the TDR measurement accuracy without increasing the sampling rate.

In an embodiment, the system and method are configured to detect positive amplitude reflections associated with an open cable fault and negative amplitude reflections associated with a shorted cable. Positive and negative amplitude reflections may also indicate mismatched impedances between two receivers as well as an impedance discontinuity along the link, wherein the positive and negative amplitude reflections are dependent on the impedance difference relative to the impedance located at the originating point of transmission. Furthermore, the system is capable of being configured to transmit pulses having a variety of corresponding pulse widths.

The system is thus able to accommodate for various distances a potential fault may be located: short width pulses are better suited for potential faults located relatively close to the originating point of transmission since long width pulses will interfere with itself, whereas for relatively farther distances, long width pulses are better suited since short width pulses attenuate with distance.

Additional embodiments described herein further detail calibrating the system for performing TDR measurements, performing TDR measurements in between transmitted communication signals of two transceivers, as well as performing TDR measurements on a daisy chain configuration of connected transceivers.

Example Embodiments

Figure 1A:
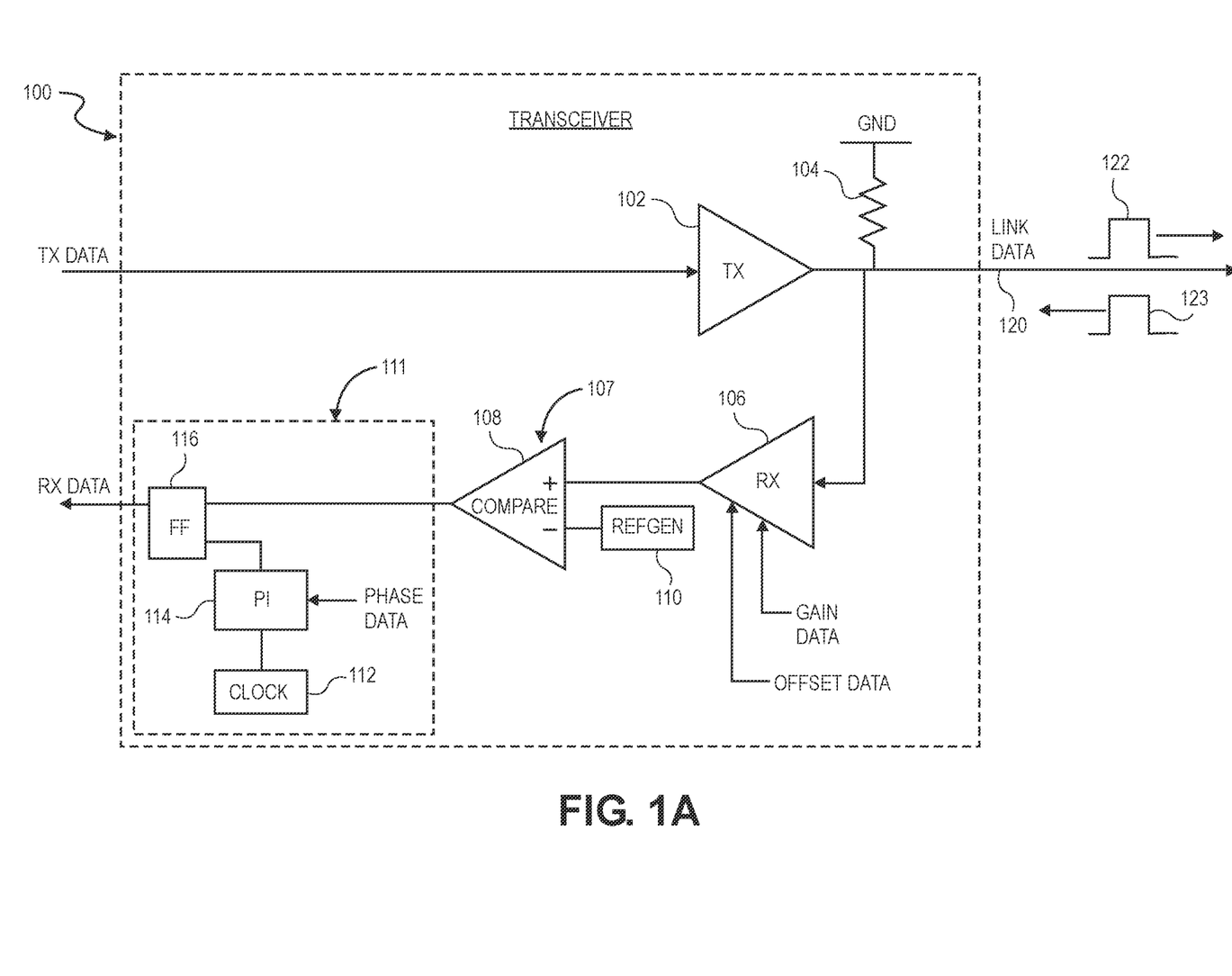
FIG. 1A is a schematic view of a time-domain reflectometer system having a phase interpolator that shifts a sampling clock signal in accordance with an example embodiment of the present disclosure.

FIG. 1A schematically illustrates a time-domain reflectometer system 100 (hereinafter also referred to as "transceiver 100") having a phase interpolator that shifts a sampling clock signal, in accordance with the present disclosure. As shown, transceiver 100 can include transmitter 102, receiver 106, detector 107 (e.g., comparator 108), and signal sampling circuit 111, which includes phase interpolator 114 and may also include flip-flop 116. In one embodiment, transmitter 102 is operatively coupled to receiver 106 and link 120, wherein signals outputted by transmitter 102 (i.e., pulse 122) are simultaneously sent to receiver 106 and link 120. Furthermore, transmitter 102 has a corresponding output termination resistance 104 that can be fixed or programmable to be able to analyze links with different characteristic impedances. However, output impedance is generally matched to the transmission medium to be analyzed (i.e., link 120). In general, transmitter 102 can be a typical transmitter known in the art of network transceivers in which transmitter 102 receives input data from a controller such as a microprocessor or the like (see, e.g., controller 802A in FIG. 8A and controller 802B in 8B), processes the input data by converting the received input data into a signal waveform appropriate for network communications, and outputs the processed signal waveform to link 120. The signal waveform is then transmitted along link 120 where it is then subsequently received by a second receiver (not shown). In this practice, a communications network is established between transmitter 102 and the second receiver. However, it should be appreciated that transmitter 102 in its simplest form can be just a pulse generator that is only configured to output pulses for performing TDR measurements. In other words, transmitter 102 can be considered inherent as a pulse generator for both outputting network communications based on received input data and/or for outputting pulses for TDR measurements. In one embodiment, transmitter 102 is configured to output a first pulse and a second pulse, wherein the first pulse has a pulse width wider than the pulse width of a second pulse. The first pulse and the second pulse permit system 100 to respectively detect potential faults at various distances from transmitter 102, with the second pulse suited for potential faults located relatively close to transmitter 102 and the first pulse suited for potential faults located at relatively farther distances from transmitter 102.

In one embodiment, link 120 is any networking cable capable of carrying a signal waveform. Typically, link 120 is an electrically conductive cable such as a metallic twisted pair or coaxial cabling. However, it should also be appreciated that transceiver 102, receiver 106, and link 120 can also be configured for use with optical network communications. In other words, in some embodiments, link 120 can be an optical cable capable of serving as an electromagnetic waveguide. In this figure, link 120 serves as a conduit for transmitting pulse 122 and pulse 123, wherein pulse 122 are signal waveforms propagating away from transmitter 102, and pulse 123 are signal waveforms propagating towards transmitter 102. For purposes in the discussion of the embodiments herein, unless indicated otherwise, pulse 123 is a reflected signal of pulse 122 that is a result of a characteristic of the link, wherein the characteristic of the link is an electrical short, an open circuit, an impedance discontinuity, or any combination thereof.

In general, receiver 106 is any receiver that is configured to receive and process signals outputted by transmitter 102 (i.e., pulse 122) as well as signals incoming from link 120 (i.e., pulse 123). As used herein, pulse 122 and pulse 123 can be collectively referred to as a "pulse" that receiver 106 receives. In one embodiment, receiver 106 is configured to process a pulse based on a gain input and an offset input, wherein the gain input and the offset input can either be a digital or analog signal originating from a controller such as a microprocessor or the like (see, e.g., controller 802A in FIG. 8A and controller 802B in 8B). In this embodiment, receiver 102 processes the pulse by scaling (i.e., amplifying) an amplitude of voltage associated with the pulse and outputting the scaled pulse, wherein the amount of scaling correlates to the gain input. Furthermore, receiver 102 processes the pulse by adding a constant voltage to the amplitude of the pulse, wherein an amount of added voltage correlates to the offset input.

In one embodiment, detector 107 is operatively coupled to receiver 106 such that detector 107 receives processed pulses outputted by receiver 106. In general, detector 107 is configured to detect the amplitude of the processed pulse based on a reference voltage and outputs a logic signal (e.g., binary) based on the amplitude. In an embodiment, detector 107 comprises comparator 108. In this embodiment, comparator 108 receives the reference voltage from a voltage generator (i.e., REFGEN 110) that is regulated by a control input. In some instances, the control input can be managed by a microprocessor, however, other techniques for generating the control input are also contemplated. In one embodiment, the voltage generator can selectively output a positive or negative reference voltage based on the control inputs received. In an embodiment, the reference voltage outputted by the voltage generator can be variable based on the control input. However, in other embodiments, the reference voltage can be constant. Comparator 108 detects the amplitude of the processed pulse by comparing the amplitude of the processed pulse against the reference voltage and outputs the logic signal depending on whether the amplitude is greater in magnitude than the reference voltage. For example, comparator 108 outputs a first signal when the amplitude is less than or equal to the reference voltage and outputs a second signal when the amplitude is greater than the reference voltage.

In general, sampling circuit 111 is operatively coupled to detector 107. Sampling circuit 111 periodically samples the outputted signals from detector 107 and outputs the sampled signal to be received by a controller such as a microprocessor or the like (see, e.g., controller 802A in FIG. 8A and controller 802B in 8B) where the sampled signals are further compiled and stored in a database (not shown) for further analysis. In this embodiment, the sampling circuit 111 comprises flip-flop 116 and phase interpolator 114. Phase interpolator 114 is configured to receive a clock signal, shift the clock signal by a phase relative to the primary clock signal based on a phase input (i.e., phase data) received by a controller such as a microprocessor or the like (see, e.g., controller 802A in FIG. 8A and controller 802B in 8B), and output the shifted clock signal. In this figure, phase interpolator 114 receives a clock signal from clock generator 112, wherein clock generator 112 is a sampling clock that outputs a primary clock signal having a sampling period associated with a bitrate. However, in other embodiments, phase interpolator 114 may receive a clock signal from a clock generator located externally from transceiver 100.

In some embodiments, phase interpolator 114 is configured to shift the phase by a predetermined step after a relaxation interval. In a trivial instance, phase interpolator 114 may shift the clock signal such that shifted clock signal aligns with the primary clock signal, thereby having no relative phase difference between the outputted clock signal and the primary clock signal. Operations of phase interpolator 114 are further detailed and described with respect to FIG. 2. In general, flip-flop 116 is a digital processing circuit that samples the logic output signal received from comparator 108 based on the shifted clock signal. More specifically, flip-flop 116 outputs the logic output signal with a period that coincides with the shifted clock signal.

Figure 1B:
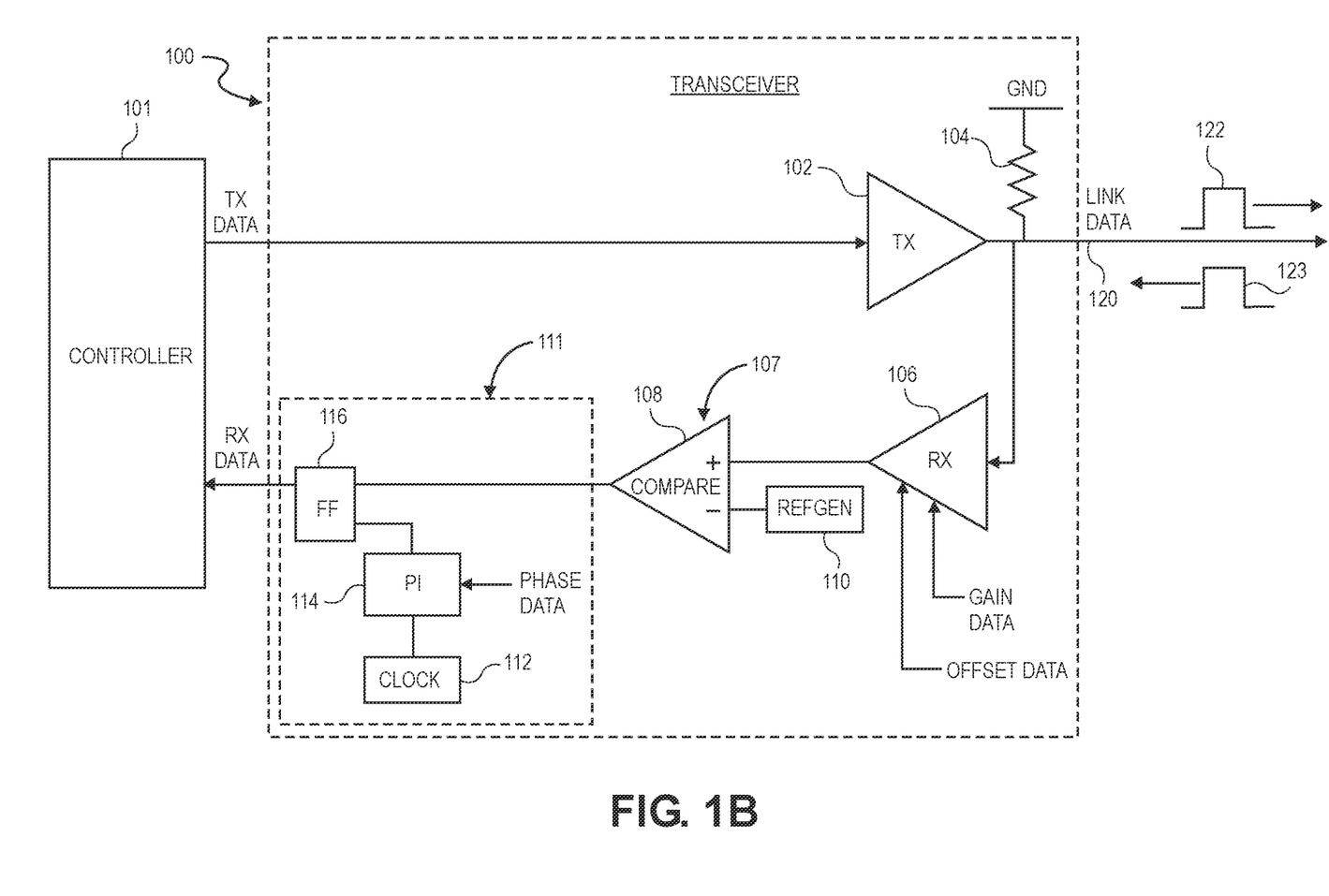
FIG. 1B is a schematic view of a time-domain reflectometer system of FIG. 1A operatively coupled with a controller for in accordance with an example embodiment of the present disclosure.

FIG. 1B schematically illustrates transceiver 100 operatively coupled with controller 101 in accordance with the present disclosure. In this figure, controller 101 is any computing device (e.g., microprocessor, microcontroller, logic circuit, etc.) that is capable of transmitting and receiving data with transceiver 100. Furthermore, controller 101 is capable of processing data received from sampling circuit 111 to determine diagnostic information (e.g., characteristics of link 120 such as fault locations along the link 120 and type of fault) based on detected amplitudes. In embodiments, controller 101 is configured to provide control input to components of transceiver 100. For example, controller 101 may transmit instructions to transmitter 102 to generate a pulse to link 120 for TDR measurements. Controller 101 may transmit instructions to receiver 106, such as gain input and offset input. Controller 101 may transmit instructions to REFGEN 110 that regulate the reference voltage supplied to comparator 108. In some instances, controller 101 may have clock generator 112. In embodiments, controller 101 is configured to receive signals from sampling circuit 111 and determine diagnostics of the link based on the received signals.

Figure 2:
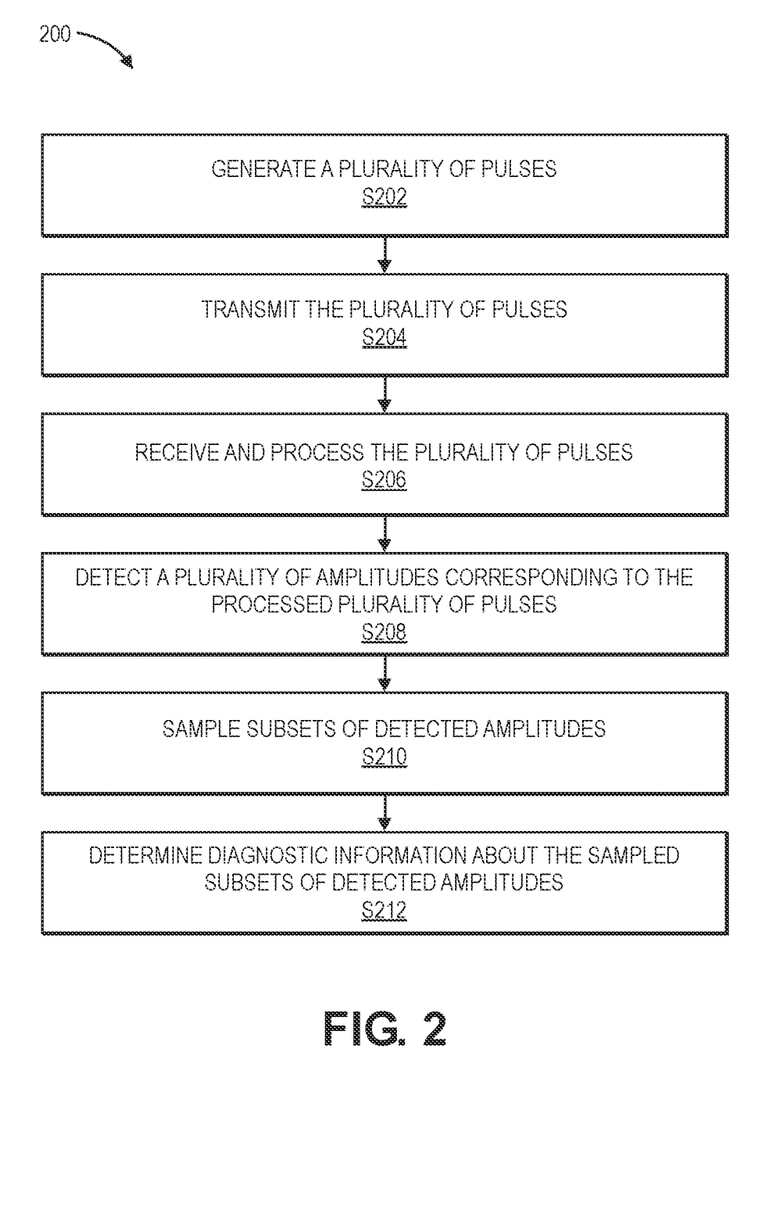
FIG. 2 is a flow diagram illustrating a method of performing a time-domain reflectometer diagnostic to a link while shifting a sampling clock signal, such as performed by the example system of FIG. 1A, in accordance with an example embodiment of the present disclosure.

Referring to FIG. 2 a method 200 of performing a time-domain reflectometer diagnostic to a link while shifting the sampling clock signal is described. The operational steps described herein are discussed with reference to the components of FIG. 1A.

In step S202, transceiver 100 generates a plurality of pulses. In one embodiment, transmitter 102 of transceiver 100 generates the plurality of pulses by outputting pulses to link 120 such that each respective pulse of the plurality of pulses is separated by a relaxation interval. As used herein, a relaxation interval is an interval of time configured to allow each pulse to be transmitted and potentially reflect without interfering with a next pulse to be transmitted. In some embodiments, transceiver 100 generates a first plurality of pulses each having a corresponding pulse width, and then generates a second plurality of pulses each having a pulse width that is greater than or less than the pulse width of the first plurality of pulses. In an embodiment, the generated plurality of pulses each have an amplitude with a positive voltage value. However, it is further contemplated that the transceiver 100 (transmitter 102) may generate the plurality of pulses so that each has an amplitude with a negative voltage value.

In step S204, transceiver 100 transmits the plurality of pulses to receiver 106 via link 120 so that each pulse of the plurality of pulses propagates along link 120 (e.g., pulse 122). If a second transceiver (not shown) is impedance matched with transceiver 100, then no signal reflection occurs. However, if a fault exists along link 120 or at the second receiver, then a signal reflection occurs and a reflected pulse is propagated back to transceiver 100 (e.g., pulse 123).

In step S206, transceiver 100 receives and processes the plurality of pulses. In embodiments, receiver 106 of transceiver 100 receives the transmitted pulse and (if a fault exists) the reflected pulse. The time between receiving the transmitted pulse and the reflected pulse is directly correlated to a distance between transceiver 100 and a fault located along link 120. In this step, receiver 106 processes the transmitted pulse and the reflected pulse by scaling the amplitude of the pulse based on the gain input and adding a constant voltage based on the offset input.

In step S208, transceiver 100 detects a plurality of amplitudes corresponding to the processed plurality of pulses. In this step, the detector (i.e., comparator 108) of transceiver 100 detects a plurality of amplitudes by receiving the processed plurality of pulses, compares an amplitude respective to each pulse to a threshold voltage, and outputs a logic signal based on the comparison. The operational steps performed by transceiver 100 for detecting the plurality of amplitudes is further discussed below with reference to FIG. 4.

In step S210, transceiver 100 samples subsets of the detected amplitudes. In this step, transceiver 100 samples subsets of the detected amplitudes based on the shifted clock signal by using the signal sampling circuit, which includes clock generator 112, phase interpolator 114, and flip-flop 116. In this step, as clock generator 112 outputs a primary clock signal, phase interpolator 114 shifts the clock signal by a predetermined step based on a phase input. In turn, the flip-flop 116 samples a subset of detected amplitudes based on the shifted clock signal, outputting a signal that is simultaneous with the period of the shifted clock signal. After each transmitted pulse of the plurality of pulses is received and a corresponding subset of detected amplitudes are sampled (i.e., after a relaxation interval), the phase input is incremented such that phase interpolator 114 shifts the clock signal by a predetermined step. The newly shifted clock signal is then used by flip-flop 116 to sample a subset of detected amplitudes for the subsequent pulse. The clock signal is shifted for each pulse until the shifted phase spans across the period of the primary clock signal, thus resulting in a subset of detected amplitudes for shifted phases.

In step S212, a computing device such as a microprocessor, microcontroller (e.g., controller 101), a logic circuit, or the like, determines diagnostic information about the sampled subsets of detected amplitudes. In embodiments, the computing device determines diagnostic information about link 120 by compiling all the subsets of detected amplitudes into a superimposed mapping of the plurality of pulses. The computing device may be controller 802A and controller 802B as discussed in reference to FIGS. 8A and 8B. Steps S210 and S212 are further described below with reference to FIG. 7.

In embodiments, the reference voltage supplied by REFGEN 110 may be a variable amount such that steps S202 through S212 may be repeated for each amount selected for the reference voltage. For example, a first plurality of pulses may be measured against a reference voltage of 150 mV, thereby only detecting amplitudes that are greater than 150 mV. A second plurality of pulses may be measured against a reference voltage of 200 mV, thereby only detecting amplitudes that are greater than 200 mV. In this sense, the subsets of detected amplitudes of the first plurality and the second plurality of pulses may be superimposed together to plot a voltage-time mapping of the combined first and second plurality of pulses to digitally reproduce the plurality of pulses received by receiver 106.

Figure 3:
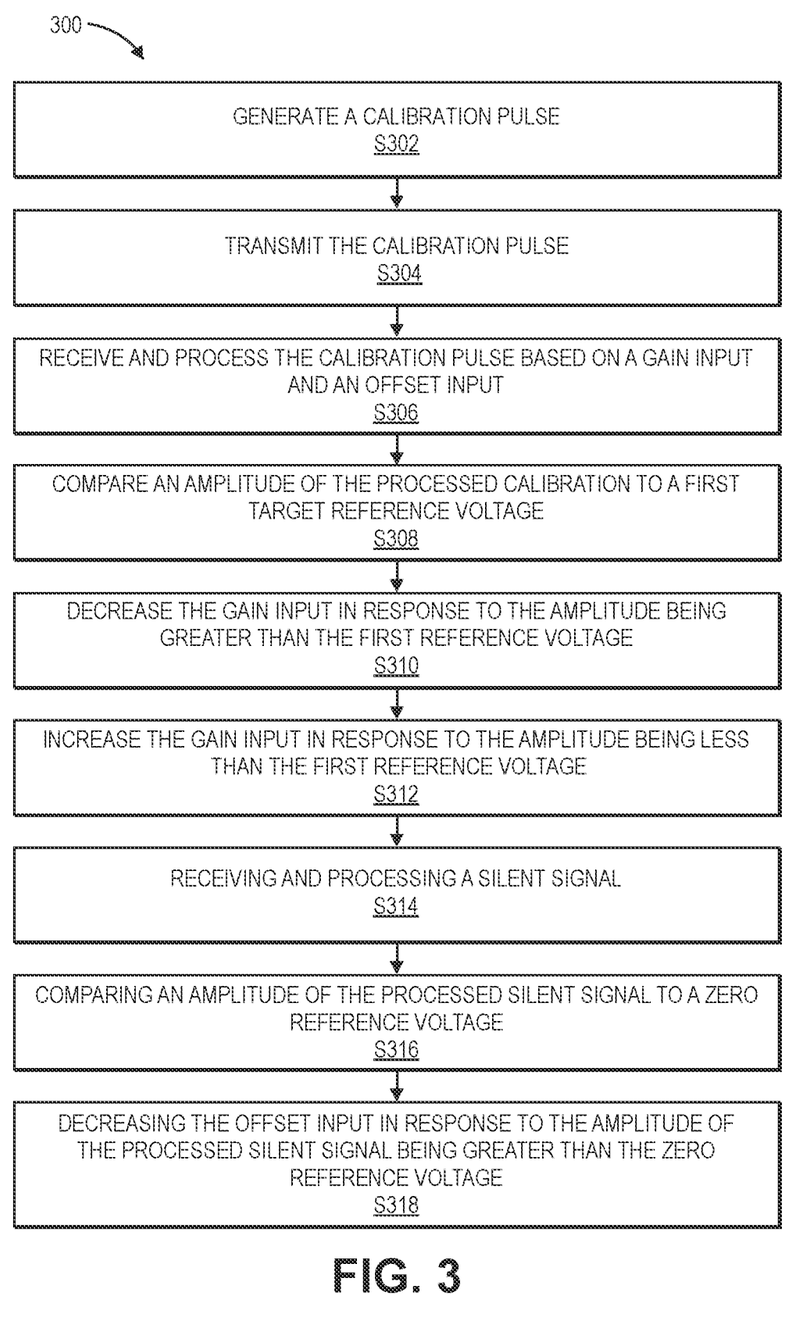
FIG. 3 is a flow diagram illustrating a method of calibrating a time-domain reflectometer system, such as the example system of FIG. 1A, in accordance with an example embodiment of the present disclosure.

Turning now to FIG. 3, a method 300 of calibrating a time-domain reflectometer system (i.e., transceiver 100) is described. In embodiments, transceiver 100 performs the following steps before performing the operational steps of FIG. 2 in order to calibrate receiver 106:

In step S302, transmitter 102 generates a calibration pulse.

In step S304, transceiver 102 transmits the calibration pulse to link 120 and receiver 106.

In step S306, receiver 106 receives and processes the calibration pulse based on a gain input and an offset input. In embodiments, receiver 106 processes the calibration pulse by scaling (i.e., amplifying) an amplitude corresponding to the calibration pulse by a scaling amount, wherein the scaling amount is correlated to the gain input received by receiver 106. Furthermore, receiver 106 processes the calibration pulse by adding an amount of constant voltage to the amplitude, wherein the amount of constant voltage is correlated to the offset input received by receiver 106.

In step S308, comparator 108 compares an amplitude of the processed calibration pulse to a first target reference voltage. In embodiments, REFGEN 110 outputs a first target voltage, and comparator 108 compares the amplitude of the processed calibration pulse to the first target voltage. The first target voltage is associated with a maximum voltage desired for output by receiver 106.

In step 310, the gain input is decreased in response to the amplitude being greater than the first reference voltage. In this step, receiver 106 is configured to decrease the gain input in response to comparator 108 determining the amplitude of the processed calibration pulse is greater than the first reference voltage, thereby reducing the amplitude of the processed calibration pulse to be equal to the first reference voltage.

In step S312, the gain input is increased in response to the amplitude being less than the first reference voltage. In embodiments, receiver 106 is configured to increase the gain input in response to comparator 108 determining the amplitude of the processed calibration pulse is less than the first reference voltage, thereby increasing the amplitude of the processed calibration pulse to be equal to the first reference voltage.

In step S314, receiver 106 receives and processes a silent signal. In embodiments, transmitter 102 is configured to output a silent signal. The silent signal is such that transmitter 102 does not drive link 120 with any voltage, such that no pulses or other waveforms are generated by transmitter 102, thereby producing a resting voltage on link 120. As such, receiver 106 receives and processes an amplitude associated with the silent signal based on the gain input and the offset input.

In step S316, the offset input is decreased in response to the amplitude of the processed silent signal being greater than the zero reference voltage. In embodiments, REGEN 110 outputs a zero reference voltage and comparator 108 compares the amplitude of the silent signal against the zero reference voltage, wherein the zero reference voltage is a voltage that matches the resting voltage of link 120. Steps S302 through S318 may be repeated until no adjustments to the gain input and the offset input are performed, thus completing calibration of receiver 106. In some embodiments, calibration of offset input may be performed prior to calibration of the gain input.

Figure 4:
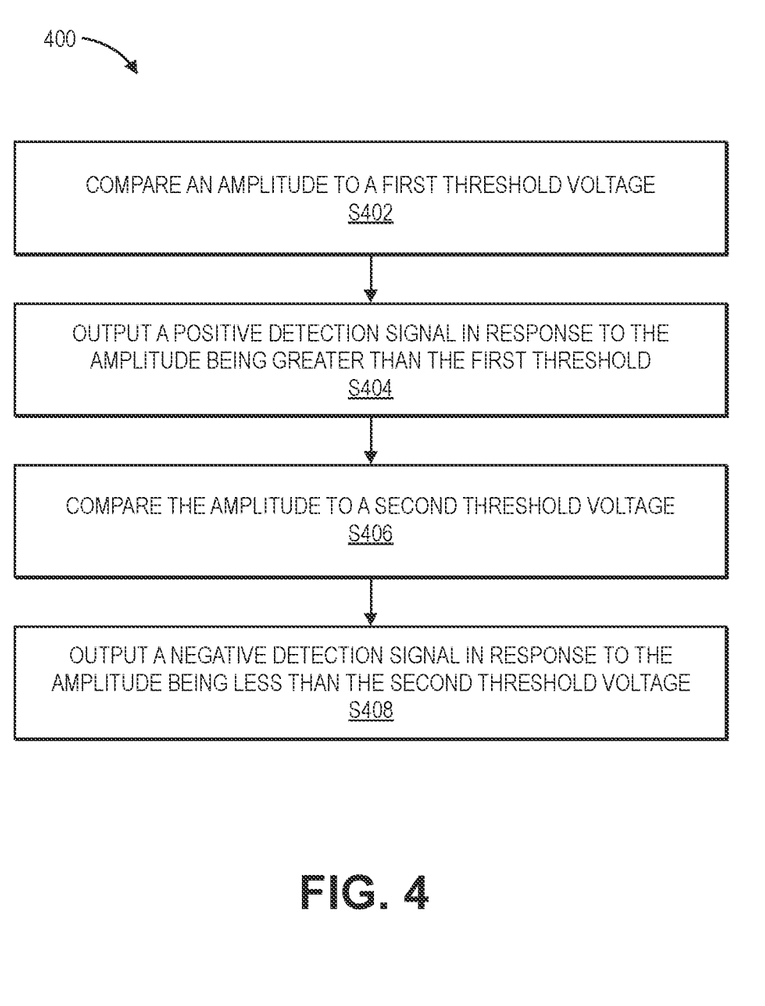
FIG. 4 is a flow diagram illustrating a method of detecting an amplitude corresponding to a pulse, such as performed by the example system of FIG. 1A, in accordance with an example embodiment of the present disclosure.

FIG. 4 illustrates a method 400 of detecting an amplitude corresponding to a pulse as performed by the example transceiver 100, in accordance with an example embodiment of the present disclosure.

In step S402, comparator 108 compares an amplitude of a pulse to a first threshold voltage. In embodiments, REFGEN 110 outputs the first threshold voltage to comparator 108, wherein the first threshold voltage is a voltage between zero volts (0V) and the target reference voltage of step S308 used during calibration of receiver 106. When step S402 is performed with transmitter 102 generating pulses with a positive voltage amplitude, the step tests for reflection signals that also have a positive voltage amplitude.

In step S404, comparator 108 outputs a positive detection signal in response to the amplitude being greater than the first voltage threshold. For example, for a logic output signal produced by comparator 108, if comparator 108 determines in S402 that the amplitude is less than the first threshold value, then comparator 108 outputs a first state (e.g., a value of "0"), thereby indicating no pulse was detected. Conversely, if comparator 108 determines that the amplitude is greater than the first threshold value, then comparator 108 outputs a second state (e.g., a value of "1"), thereby indicating that a pulse was detected. Steps S402 and S404 are further described below with reference to FIG. 5.

In step S406, comparator 108 compares an amplitude of a pulse to a second threshold voltage. In embodiments, REFGEN 110 outputs the second threshold voltage to comparator 108, wherein the second threshold voltage is a negative reflection of the first threshold voltage relative to the zero reference voltage used in S402 and S404. For example, if the first threshold voltage is 150 mV with a zero reference voltage of zero volts (0V), then the second threshold voltage is −150 mV. When this step is performed with transmitter 102 generating pulses having a positive voltage amplitude, then the step tests for reflection signals that have a negative voltage amplitude.

In step S408, comparator 108 outputs a negative detection signal in response to the amplitude being less than the second voltage threshold. For example, for a logic output signal produced by comparator 108, if comparator 108 determines, in step S406, that the amplitude is greater than the second threshold value, then comparator 108 outputs a first state (e.g., a value of "0"), thereby indicating that no pulse was detected. Conversely, if comparator 108 determines that the amplitude is less than the second threshold value, then comparator 108 outputs a second state (e.g., a value of "1"), thereby indicating that a pulse was detected. In the example embodiment discussed, the first state has been shown as having a value of "0" and the second state as having a value of "1." However, those of skill in the art will understand that any respective value may be assigned to the first state and the second state such that they respectively represent a detected pulse or no detected pulse. Steps S406 and S408 are further described below with reference to FIG. 6.

Figure 5:
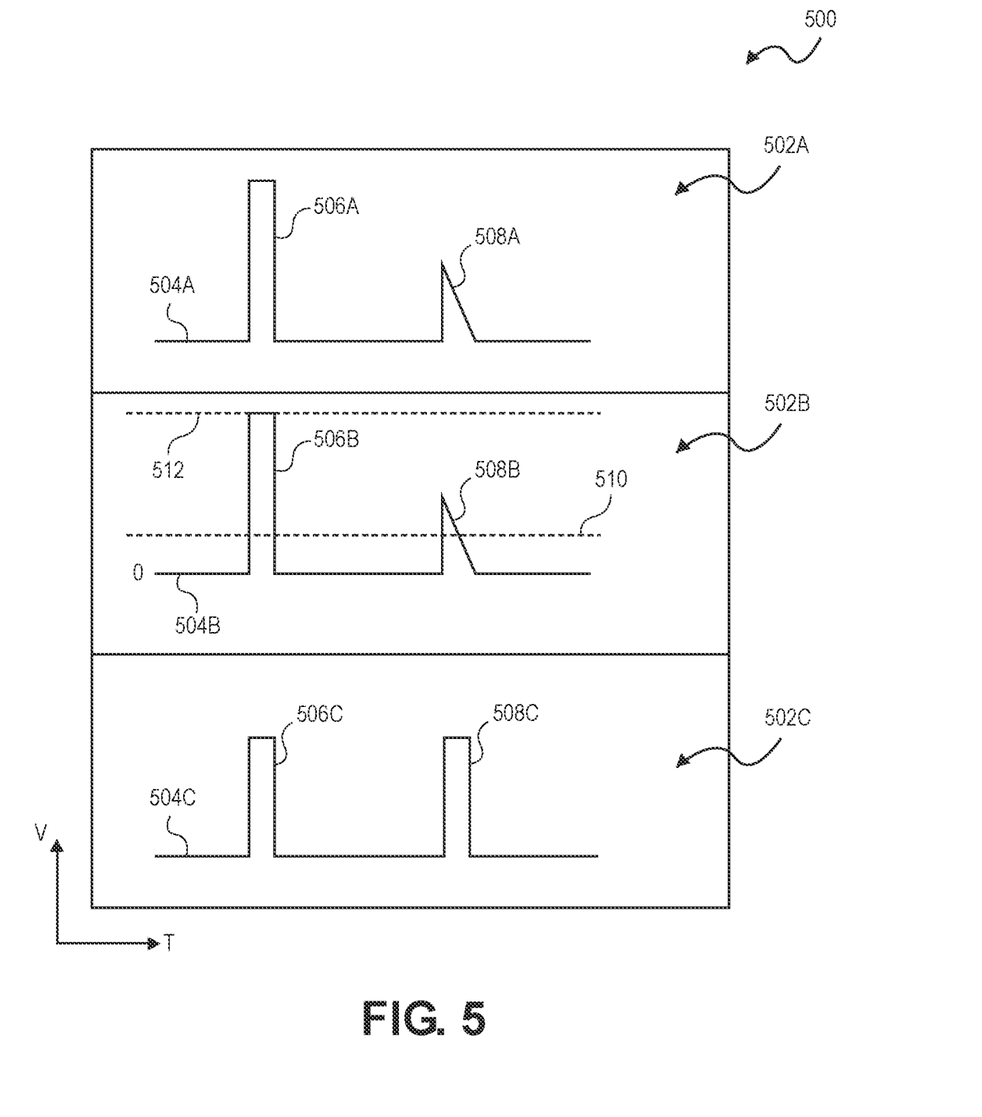
FIG. 5 is a graphical illustration depicting a signal processing operation of detecting a positive detection signal, which may be performed by the example system of FIG. 1A, in accordance with an embodiment of the present disclosure.

FIG. 5 furnishes a graphical illustration 500 that depicts the operational steps performed in detecting a positive detection signal (i.e., steps S402 and S404). In graphical illustration 500, graph 502A plots a signal received by receiver 106. As shown, the signal includes a first pulse and a second pulse, wherein the first pulse corresponds to a pulse generated by transmitter 102 (e.g., the first pulse is pulse 122) and the second pulse corresponds to a positive reflected signal produced as a result of the first pulse reflecting from a fault located on link 120 (e.g., the second pulse is pulse 123). Similarly, graph 502B plots a graphical representation of the output of receiver 106 of the operational step S402 in comparing an amplitude of a processed pulse to a first threshold voltage, while graph 502C plots an outputted signal representing the operational step S404 in detecting the pulse. Graphs 502A-C in graphical illustration 500 are voltage-time plots with each graph being horizontally aligned with each of the other graphs with respect to time.

In graph 502A, signal 504A indicates no signal, signal 506A indicates the first pulse, and 508A indicates the second pulse. In graph 502B, signal 504B corresponds to signal 502A, wherein signal 504B is measured at zero volts (0V) as a result of the offset calibration steps performed in S318. Furthermore, pulses 506B and 508B correspond to the pulses 506A and 508A. However, pulses 506B and 508B have amplitudes that are greater than threshold 510 (i.e., the first threshold of S402). Furthermore, graph 502B illustrates that the signal is processed by receiver 106 in such a way that signal 506A is outputted as signal 506B based on the gain input as a result of the gain calibration steps performed in S306 through S312, wherein the peak of signal 506B is equal to the first reference voltage. In this figure, the first reference voltage is represented as reference voltage 512. In graph 502C, since signal 504C has an amplitude that is less than threshold 510, then comparator 108 outputs signal 504C as a first state (e.g., a value of "0"). Likewise, since pulses 506B and 508B have corresponding amplitudes that are greater than threshold 510, comparator 108 outputs respective signals 506C and 508C as a second state (e.g., a value of "1").

Figure 6:
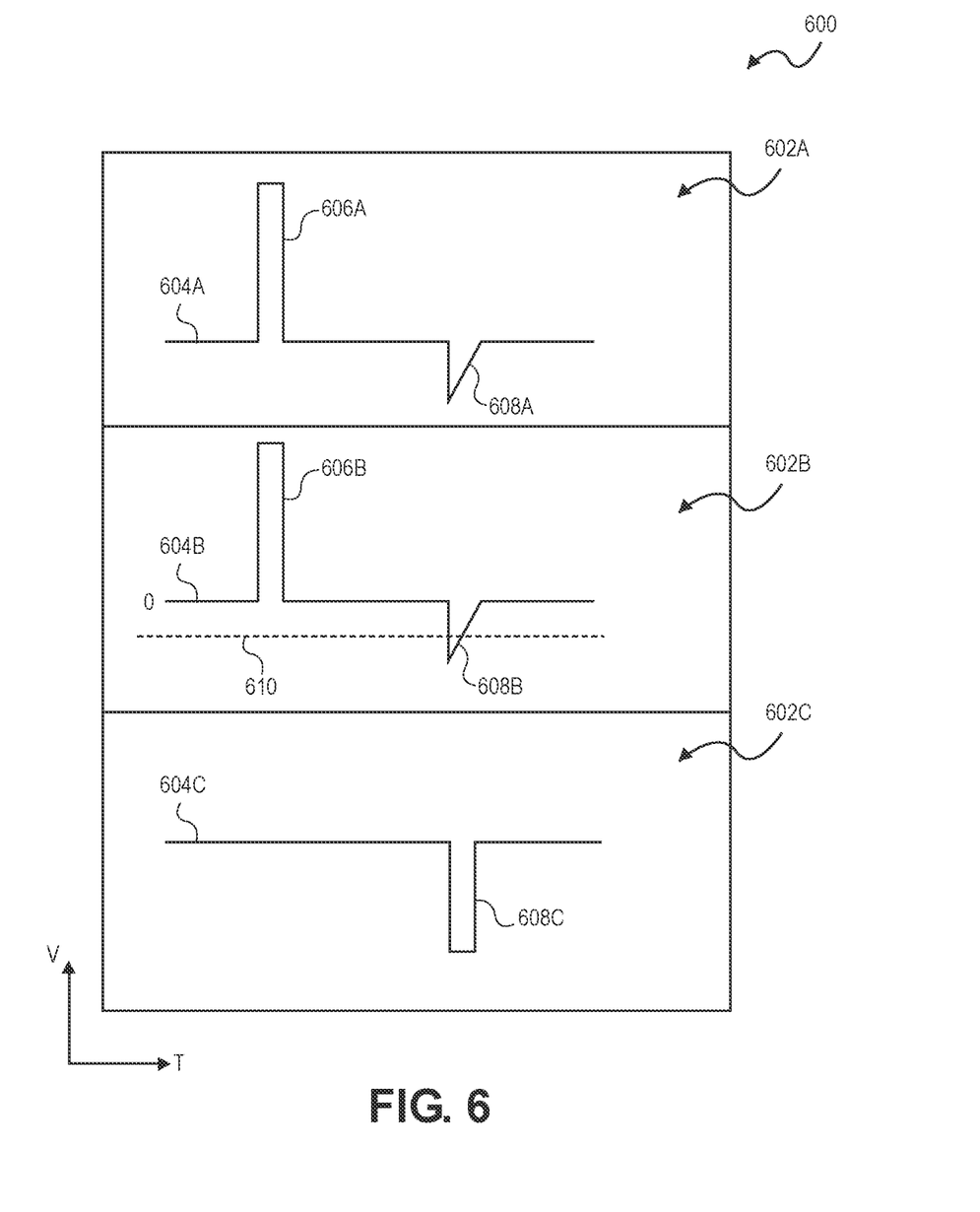
FIG. 6 is a graphical illustration depicting a signal processing operation of detecting a negative detection signal, such as the example system of FIG. 1A, in accordance with an embodiment of the present disclosure.

FIG. 6 furnishes a graphical illustration 600 that depicts the operational steps performed in detecting a negative detection signal (i.e., steps S406 and S408). In graphical illustration 600, graph 602A plots a signal received by receiver 106. As shown, the signal includes a first pulse and a second pulse, wherein the first pulse corresponds to a pulse generated by transmitter 102 and the second pulse corresponds to a negative reflected signal produced as a result of the first pulse reflecting from a fault located on link 120. Graph 602B plots a graphical representation of the operational step S406 in comparing an amplitude of the processed pulse to a second threshold voltage, while graph 602 plots an outputted signal representing the operational step S408 in detecting the pulse. Graphs 602A-C in graphical illustration 600 are voltage-time plots with each graph being vertically aligned with each of the other graphs with respect to time.

In graph 602A, signal 604A indicates no signal, signal 606A indicates the first pulse, and 608A indicates the second pulse. In graph 602B, signal 604B corresponds to signal 602A, wherein signal 604B is measured at zero volts (0V) as a result of the offset calibration performed in step S318. Furthermore, pulses 606B and 608B correspond to the pulses 606A and 608A. However, only pulse 608B has an amplitude that is less than the threshold 610 (i.e., the second threshold of S406). In graph 602C, since signal 604B and pulse 606B both have an amplitude that is greater than threshold 610, then comparator 108 outputs signal 604C as a first state (e.g., a value of "0"). Likewise, since pulse 608B has an amplitude that is less than threshold 610, then comparator 108 output signal 608C as a second state (e.g., a value of "1").

Figure 7:
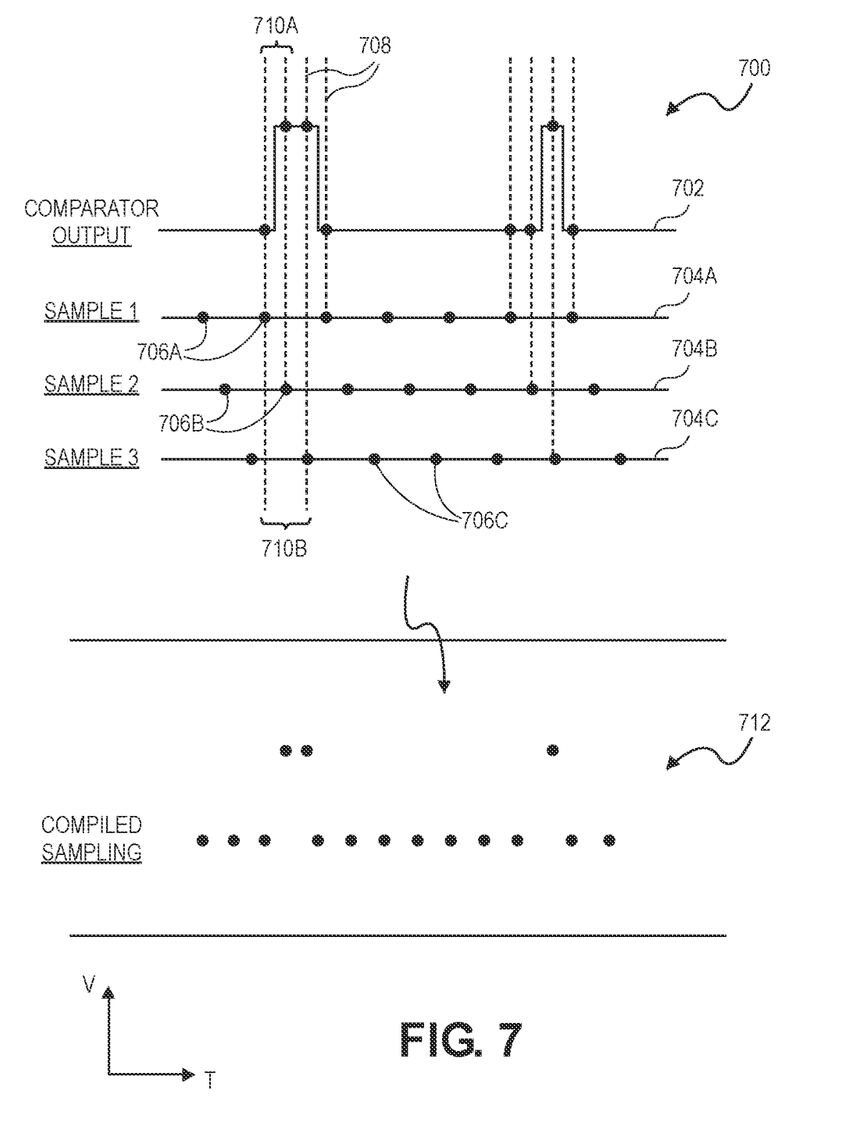
FIG. 7 is a graphical illustration depicting a set of clock signals each shifted by a phase for sampling a detected amplitude, such as performed by the example system of FIG. 1A, in accordance with an embodiment of the present disclosure.

In FIG. 7, graphical illustrations 700 and 712 depict an example of a set of clock signals each shifted by a phase for sampling a detected amplitude, such as performed by transceiver 100 of FIG. 1A, in accordance with an embodiment of the present disclosure.

In embodiments, comparator output 702 is sampled according to clock signals 704A-C each having intervals 706A-C, which measure comparator output 702 corresponding to vertical lines 708. In this example, comparator output 702 represents a plurality of pulses generated by transmitter 102 such that the plurality of pulses are identical to each other and are superimposed for clarity. In other words, a first comparator output is measured according to clock signal 704A, a second comparator output is measured according to clock signal 704B, and a third comparator output is measured according to clock signal 704C, wherein the comparator output 702 is a superposition of the first, second, and third comparator outputs.

In this example, clock signal 704A has a period that samples comparator output 702 at intervals 706A. However, since comparator output 702 has a first pulse and a second pulse that falls between the period of clock signal 704A, intervals 706A fail to detect the first and the second pulse. To improve accuracy in sampling comparator output 702, phase interpolator 114 shifts the phase of clock signal 704A by step 710A and measures comparator output 702 using intervals 706B. Likewise, phase interpolator 114 shifts the phase of clock signal 704B again by step 710A, thereby having a total phase difference relative to clock signal 704A represented by step 710B, and measures comparator output 702 using intervals 706C.

In this example, a corresponding subset of detected amplitudes of comparator output 702 is captured according to clock signals 704A-C. Diagnostic information about a link that is associated with comparator output 702 can then be determined by superimposing the corresponding subsets together to produce compiled sampling 712 which matches with comparator output 702. In embodiments, each subset of detected amplitudes corresponding to clock signals 704A-C are superimposed onto each other based on a common reference signal among the plurality of pulses. The common reference signal can be, but is not limited to, a corresponding detection of pulse 122 or a primary clock signal that triggers transmitter 102 to transmit pulse 122. For example, a first pulse is transmitted at time $t_1$ and is measured by clock signal 704A. At a later time, a second pulse is transmitted at time $t_2$ and is measured by clock signal 704B. Then, at an even later time, a third pulse is transmitted at time $t_3$ and is measured by clock signal 704C. To produce compiled sampling 712, samplings corresponding to each clock signal 704A-C are shifted in a time-domain such that time $t_1$ of clock signal 704A, time $t_2$ of clock signal 704B, and time $t_3$ of clock signal 704C are all aligned with each other (i.e., the first pulse, second pulse, and third pulse are superimposed on each other in a time-domain) to produce a time-voltage plot of the sampled signals to represent compiled sampling 712. Thus the accuracy of TDR measurements can be improved without decreasing the clock period for data sampling.

Figure 8A:
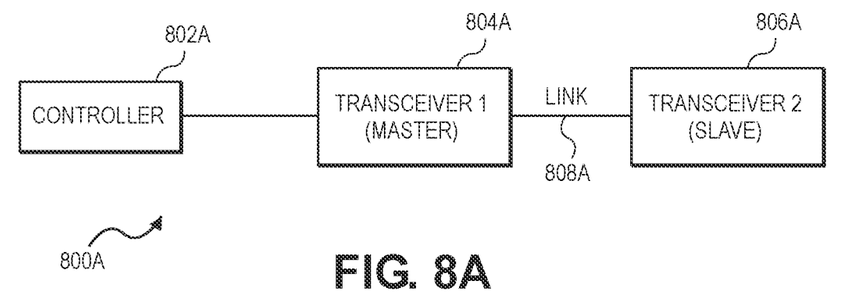
FIG. 8A is a block diagram of a first network environment for performing diagnostics using a time-domain reflectometer system, such as the example system of FIG. 1A, in accordance with an embodiment of the present disclosure.
Figure 8B:
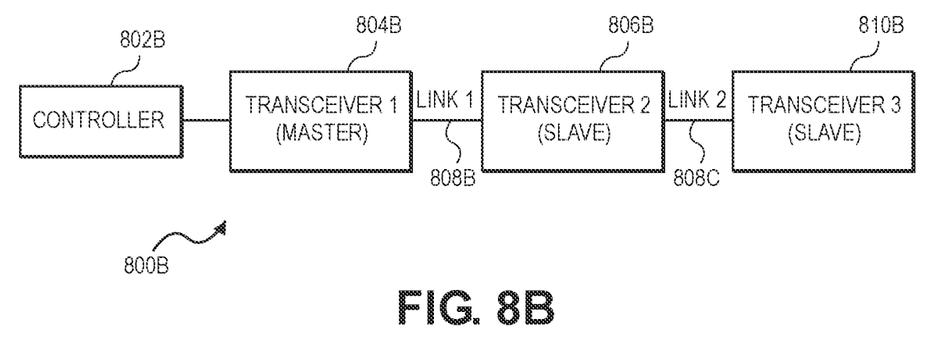
FIG. 8B is a block diagram of a second network environment for performing diagnostics of a link using a time-domain reflectometer system, such as the example system of FIG. 1A, in accordance with an embodiment of the present disclosure.

FIG. 8A illustrates a network environment 800A demonstrating an arrangement for transceiver 100 to perform diagnostics to a link, in accordance with an embodiment of the present disclosure.

FIG. 8A represents a simple arrangement for performing TDR measurements on a single link connecting between two transceivers. In the embodiment illustrated, controller 802A is any computing device (e.g., a microprocessor or logic circuit) capable of transmitting and receiving data with transceiver 804A. In other words, controller 802A is controller 101 illustrated in FIG. 1B. Furthermore, controller 802A is configured to determine diagnostic information based on TDR signal sampling provided by a transceiver that has the components and characteristics of transceiver 100. In some embodiments, controller 802A and transceiver 804A are incorporated as a single device. In this figure, controller 802A is operatively coupled with transceiver 804A, wherein transceiver 804A is configured to operate as transceiver 100 as discussed herein. Furthermore, transceiver 804A is communicatively coupled with transceiver 806A via link 808A. In this arrangement, transceiver 804A, serving as transceiver 100, is capable of performing TDR diagnostics on link 808A and outputting sampling data associated with the link to controller 802A.

FIG. 8B illustrates a network environment 800B demonstrating an arrangement for transceiver 100 to perform diagnostics to one or more links, in accordance with an embodiment of the present disclosure.

FIG. 8B depicts a "daisy chain" arrangement for performing TDR measurements on one or more links with each link connecting between two transceivers. In the embodiment illustrated, controller 802B is any computing device capable of transmitting and receiving data with transceiver 804B, transceiver 806B, and 810B. In other words, controller 802B is controller 101 illustrated in FIG. 1B. However, for the purpose of this example, controller 802B is not permitted to communicate with transceiver 806B until link 808B is determined to be acceptable based on a TDR diagnostic. Furthermore, controller 802B is configured to determine diagnostic information based on TDR signal sampling provided by a transceiver that has the components and characteristics of transceiver 100. In some embodiments, controller 802B and transceiver 804B may be integrated as a single device. In this figure, transceiver 804B and transceiver 804B are both configured to operate as independent versions of transceiver 100 as discussed herein, and controller 802B is operatively coupled with transceiver 804B. Furthermore, transceiver 804B is communicatively coupled with transceiver 806B via link 808B, and likewise, transceiver 806B is communicatively coupled with transceiver 810B via link 808C. In this arrangement, transceiver 804B is capable of performing TDR diagnostics on link 808B and outputting sampling data associated with link 808B to controller 802B. If controller 802B determines link 808B is acceptable based on the sampling data, then controller 802B is permitted to communicate with transceiver 806B, thereby establishing a daisy chain network of transceivers for performing TDR diagnostics for a link next in line. Controller 802B then instructs transceiver 806B to perform TDR diagnostics on link 808C and to output sampling data associated with link 808C to controller 802B via link 808B. Through this arrangement, additional iterations of paired transceivers connected by a link can be daisy-chained so long as each transceiver is configured to include the features of transceiver 100, with the possible exception of the most distal receiver (e.g., transceiver 806A as illustrated in FIG. 8A, and transceiver 810B as illustrated in FIG. 8B).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for performing diagnostics of a link, comprising:
   a pulse generator operatively coupled to the link, the pulse generator configured to output a pulse to the link;
   a receiver operatively coupled to the link, the receiver configured to receive and process the pulse;
   a detector operatively coupled to the receiver, the detector configured to detect an amplitude of the processed pulse based on a reference voltage; and
   a signal sampling circuit operatively coupled to the detector, the signal sampling circuit including at least a phase interpolator, the phase interpolator configured to shift a period of a clock signal by a phase, the signal sampling circuit configured to output a signal based on the detected amplitude and the clock signal, wherein the outputted signal describes a characteristic of the link.

2. The system of claim 1, wherein the pulse generator is configured to output a first pulse and a second pulse, wherein the first pulse has a pulse width wider than the second pulse.

3. The system of claim 1, wherein the pulse received by the receiver is a reflected pulse that is characteristic of the link.

4. The system of claim 1, wherein the receiver is configured to process the pulse based on a gain input and an offset input.

5. The system of claim 1, wherein the reference voltage is variable.

6. The system of claim 1, wherein the detector outputs a logic output signal based on the detected amplitude.

7. The system of claim 6, wherein the signal sampling circuit is configured to output the signal based on the logic output signal.

8. The system of claim 1, wherein the signal sampling circuit further comprises a flip-flop circuit operatively coupled to the detector and the phase interpolator, the flip-flop circuit configured to output the signal based on the detected amplitude and the clock signal.

9. The system of claim 1, further comprising:
   a first transceiver operatively coupled to a first end of the link; and
   a second transceiver operatively coupled to a second end of the link, the first transceiver and the second transceiver configured to communicate to each other via the link.

10. The system of claim 9, wherein:
    the first transceiver is configured to transmit a network handshake to the second transceiver and to cease signal transmissions for a predetermined period in response to transmitting the network handshake;
    the second transceiver is configured to cease signal transmissions during the predetermined period in response to receiving the network handshake; and
    the pulse generator is operatively coupled to the first transceiver, the pulse generator configured to output the pulse to the link during the predetermined period in response to the first transceiver transmitting the network handshake.

11. The system of claim 9, wherein the pulse generator is operatively coupled to the first transceiver, the pulse generator configured to output the pulse to the link in response to the first transceiver determining the second transceiver has ceased signal transmissions for a predetermined period.

12. The system of claim 9, further comprising:
    a third transceiver operatively coupled to a first end of a second link; and
    the first transceiver operatively coupled to a second end of the second link;
    wherein the pulse generator is operatively coupled to the first transceiver, the pulse generator configured to output the pulse to the second link in response to the first transceiver receiving a master signal transmitted by the second transceiver.

13. A method of performing diagnostics on a link, the method comprising:
    generating a plurality of pulses in a pulse generator, respective ones of the plurality of pulses separated by a relaxation interval;
    transmitting the plurality of pulses from a first end of the link;
    receiving and processing the plurality of pulses in a receiver;
    detecting a plurality of amplitudes corresponding to the processed plurality of pulses in a detector based on a reference voltage;
    sampling one or more subsets of detected amplitudes based on a clock signal, wherein each subset of detected amplitudes corresponds to a respective phase of the clock signal; and
    determining diagnostic information about the link based on the sampled one or more subsets of detected amplitudes.

14. The method of claim 13, wherein the sampling one or more subsets of detected amplitudes based on a clock signal further comprises:

shifting the phase of the clock signal by a predetermined step after each relaxation interval.

15. The method of claim 13, wherein the plurality of pulses received and processed in the receiver are a plurality of reflected pulses that are characteristic of the link.

16. The method of claim 13, wherein the processing the plurality of pulses in a receiver is based on a gain input and offset input.

17. The method of claim 13, further comprising:
calibrating the receiver based on a calibration pulse, a gain input, and an offset input.

18. The method of claim 17, wherein the calibrating the receiver based on the calibration pulse, a gain input, and an offset input comprises:
generating the calibration pulse in the pulse generator;
transmitting the calibration pulse from the first end of the link;
receiving and processing the calibration pulse in the receiver based on a gain input and an offset input;
comparing an amplitude of the processed calibration pulse to a first target reference voltage and a second target reference voltage, the first target reference voltage being greater than the second target reference voltage;
decreasing the gain input of the receiver in response to the amplitude being greater than the first target reference voltage;
increasing the gain input of the receiver in response to the amplitude being less than the first target reference voltage;

receiving and processing a silent signal in the receiver in response to comparing the amplitude of the processed calibration pulse, wherein the silent signal exclude the calibration signal;
comparing an amplitude of the processed silent signal to a zero reference voltage; and
decreasing the offset input of the receiver in response to the amplitude of the processed silent signal being greater than the zero reference voltage.

19. The method of claim 13, wherein the detecting a plurality of amplitudes corresponding to the processed plurality of pulses in a detector based on a reference voltage further comprises:
comparing each amplitude to a first threshold voltage, wherein the first threshold voltage has a positive voltage value;
outputting a positive detection signal in response to the amplitude being greater than the first threshold voltage;
comparing each amplitude to a second threshold voltage, wherein the second threshold voltage has a negative voltage value; and
outputting a negative detection signal in response to the amplitude being less than the second threshold voltage.

20. The method of claim 19, wherein the plurality of pulses generated by the pulse generator originate with a positive voltage value.

* * * * *